(12) United States Patent
Walker et al.

(10) Patent No.: US 12,636,839 B2
(45) Date of Patent: May 26, 2026

(54) WATER ACTIVATED TAPE CASE SEALERS

(71) Applicant: Intertape Polymer Corp., Sarasota, FL (US)

(72) Inventors: Doug Walker, Sarasota, FL (US); Zachary S. Kissel, Sarasota, FL (US); Michael Curtin, Sarasota, FL (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 149 days.

(21) Appl. No.: 18/323,944

(22) Filed: May 25, 2023

(65) Prior Publication Data

US 2023/0382056 A1     Nov. 30, 2023

Related U.S. Application Data

(60) Provisional application No. 63/365,386, filed on May 26, 2022.

(51) Int. Cl.
| | |
|---|---|
| *B29C 65/50* | (2006.01) |
| *B29C 65/48* | (2006.01) |
| *B65B 51/06* | (2006.01) |
| *B65H 26/06* | (2006.01) |

(52) U.S. Cl.
CPC ........ *B29C 65/5092* (2013.01); *B29C 65/484* (2013.01); *B65B 51/067* (2013.01); *B65H 26/06* (2013.01); *B65H 2301/5142* (2013.01); *B65H 2404/1521* (2013.01); *B65H 2553/40* (2013.01); *B65H 2553/51* (2013.01)

(58) Field of Classification Search
CPC ............. B29C 65/5092; B29C 65/484; B65B 51/067; B65H 26/06; B65H 2301/5142
See application file for complete search history.

(56) References Cited

U.S. PATENT DOCUMENTS

| | | | | |
|---|---|---|---|---|
| 3,461,020 A | * | 8/1969 | Loveland | B65B 51/067 |
| | | | | 156/468 |
| 2014/0026810 A1 | * | 1/2014 | Lazzaroni | B65H 35/0046 |
| | | | | 118/231 |

FOREIGN PATENT DOCUMENTS

| | | | | | |
|---|---|---|---|---|---|
| JP | H074460 U | * | 1/1995 | | |
| KR | 101309907 B1 | * | 9/2013 | | B65B 35/56 |
| KR | 102148835 B1 | * | 8/2020 | | |
| WO | WO-0041960 A1 | * | 7/2000 | | B31B 70/00 |

* cited by examiner

*Primary Examiner* — Daniel McNally
(74) *Attorney, Agent, or Firm* — Jeffrey R. Gray; Moore & Van Allen PLLC

(57) ABSTRACT

A water activated tape system includes a tape roller, a water bottle, and a first wipedown mechanism. The tape roller is configured to dispense water activated tape. The water bottle is configured provide liquid to wet the water activated tape. The first wipedown mechanism is configured to press the water activated tape onto a carton. The first wipedown mechanism includes a first hinged arm, a first roller, disposed at a first end of the first hinged arm, a second hinged arm, and a second roller, disposed at a first end of the second hinged arm.

19 Claims, 11 Drawing Sheets

WATER ACTIVATED TAPE CASE SEALERS

PRIORITY CLAIM AND CROSS-REFERENCE TO RELATED APPLICATIONS

The present application claims priority to and the benefit of U.S. Provisional Patent App. No. 63/365,386 filed May 26, 2022, titled WATER ACTIVATED TAPE CASE SEALERS, the entire contents of which are incorporated by reference herein in their entirety and relied upon.

FIELD

The present disclosure relates generally to systems and methods for sealing cases and cartons with water activated tape. More specifically, this disclosure relates to systems and methods of improved application and measurement of water activated tape, resulting in overall improvements to packaging processing efficiency.

BACKGROUND

Systems and methods implementing case sealing, such as sealing the top and/or bottom of a carton, prior to shipment, typically employ tape in some form. Namely, an unsealed but folded carton passes an operator, and the operator manually seals the top and bottom of the carton with tape. Alternatively, certain systems may implement an automated taping process, whereby a machine seals the top and bottom of the carton with tape instead of the operator.

Water activated tape is a type of tape, which is initially non-adhesive. Specifically, a roll of non-adhesive water activated tape may be easily unrolled and applied (e.g., because it does not stick to itself initially) to a carton. During application (or shortly before or thereafter), the water activated tape is moistened or wetted. Once wet, specific compositions on the water activated tape undergo phase transformation, such that the compounds exhibit new adhesive characteristics. Beneficially, water activated tape is adhesive-controlled tape, in that the tape is not adhesive until adhesion is desired; once desired, wetting the water activated tape initiates the adhesion of the tape.

That said, water activated tape often requires a more dynamic application (e.g., onto a carton) if adhesion has not been fully initiated. For example, water activated tape may require physical pressing or wipedown. This added step is particularly critical in high-speed automated sealing operations, where wipedown occurs in rapid succession. During rapid processing, it is often difficult to identify certain errors associated with water activated tape, such as tape errors and low water conditions (resulting in reduced adhesion). Further, because water activated tape is usually application-specific, it is difficult to provide for varied carton sizes and/or pass-through for non-water activated tape cartons and packages.

Improved systems and methods for sealing cases and cartons with water activated tape are therefore needed.

SUMMARY

The systems and methods for sealing cases and cartons with water activated tape disclosed herein improve on current packaging technology, by implementing mechanisms with variable wipedown pressure. This ensures that water activated tape is properly "pressed" to a case as the case is conveyed past the packaging system. Variable wipedown pressure devices vary the "pressing" of the water activated tape across the case's surface and, most importantly, along the case's corners, thus reducing risk of unintentional crushing while simultaneously ensuring proper adhesion. The systems and methods herein further implement tape error detection, by measuring water activated tape distance as it is applied in an effort to identify water activated tape-specific faults. The systems and methods herein implement low water sensors, to ensure adequate and appropriate wetting of water activated tape. The systems and methods herein further provide for pass-through of non-water activated tape cases and cartons, to allow for more robust and varied processing of items that do (and that do not) require water activated taping for sealing purposes.

In light of the disclosure herein, and without limiting the scope of the invention in any way, in a first aspect of the present disclosure, which may be combined with any other aspect listed herein unless specified otherwise, a water activated tape system includes a tape roller, a water bottle, and a first wipedown mechanism. The tape roller is configured to dispense water activated tape. The water bottle is configured to provide liquid to wet the water activated tape. The first wipedown mechanism is configured to press the water activated tape onto a carton. The first wipedown mechanism includes a first hinged arm, a first roller, disposed at a first end of the first hinged arm, a second hinged arm, and a second roller, disposed at a first end of the second hinged arm.

In a second aspect of the present disclosure, which may be combined with any other aspect listed herein unless specified otherwise, In a third aspect of the present disclosure, which may be combined with any other aspect listed herein unless specified otherwise, the first wipedown mechanism is configured to engage with a first corner of the carton, such that the first roller engages with a front face of the carton, and such that the second roller engages with a top face of the carton.

In a fourth aspect of the present disclosure, which may be combined with any other aspect listed herein unless specified otherwise, the system further includes a second wipedown mechanism. The second wipedown mechanism is configured to engage with a second corner of the carton, such that a third roller engages with a front face of the carton, and such that a fourth roller engages with a bottom face of the carton.

In a fifth aspect of the present disclosure, which may be combined with any other aspect listed herein unless specified otherwise, the system further includes a processor, configured to calculate a length of water activated tape applied to the carton.

In a sixth aspect of the present disclosure, which may be combined with any other aspect listed herein unless specified otherwise, the length of water activated tape is calculated by measuring a length of the carton via a distance traveled by the carton.

In a seventh aspect of the present disclosure, which may be combined with any other aspect listed herein unless specified otherwise, the distance traveled by the carton is determined via a first encoder disposed on a conveyor belt.

In an eight aspect of the present disclosure, which may be combined with any other aspect listed herein unless specified otherwise, the length water of activated tape is calculated by measuring rotation of the tape roller.

In a ninth aspect of the present disclosure, which may be combined with any other aspect listed herein unless specified otherwise, rotation of the tape roller is determined via a second encoder disposed on the tape roller.

In a tenth aspect of the present disclosure, which may be combined with any other aspect listed herein unless specified otherwise, the second encoder is an optical encoder.

In an eleventh aspect of the present disclosure, which may be combined with any other aspect listed herein unless specified otherwise, the water bottle includes a sensor to determine a level of water in the water bottle.

In a twelfth aspect of the present disclosure, which may be combined with any other aspect listed herein unless specified otherwise, the first wipedown mechanism does not press water activated tape onto the carton.

In a thirteenth aspect of the present disclosure, which may be combined with any other aspect listed herein unless specified otherwise, a water activated tape system includes a tape roller, configured to dispense water activated tape, a water bottle, a first wipedown mechanism, and a conveyor belt. The water bottle is configured to provide liquid to wet the water activated tape. The first wipedown mechanism is configured to press the water activated tape onto a carton. The conveyor belt is configured to convey the carton. A first encoder is disposed on the conveyor belt and configured to measure a length of the carton.

In a fourteenth aspect of the present disclosure, which may be combined with any other aspect listed herein unless specified otherwise, the length of the carton is used to calculate a length of water activated tape applied to the carton.

In a fifteenth aspect of the present disclosure, which may be combined with any other aspect listed herein unless specified otherwise, a processor compares the length of water activated tape applied to the carton to a threshold length.

In a sixteenth aspect of the present disclosure, which may be combined with any other aspect listed herein unless specified otherwise, responsive to the length of water activated tape applied to the carton exceeding the threshold length, sounding an alarm.

In a seventeenth aspect of the present disclosure, which may be combined with any other aspect listed herein unless specified otherwise, a length of water activated tape is calculated by measuring rotation of the tape roller.

In an eighteenth aspect of the present disclosure, which may be combined with any other aspect listed herein unless specified otherwise, rotation of the tape roller is determined via a second encoder disposed on the tape roller.

In a nineteenth aspect of the present disclosure, which may be combined with any other aspect listed herein unless specified otherwise, the first wipedown mechanism is configured to press the water activated tape onto a carton.

In a twentieth aspect of the present disclosure, which may be combined with any other aspect listed herein unless specified otherwise, the first wipedown mechanism includes a first hinged arm, a first roller, disposed at a first end of the first hinged arm, a second hinged arm, and a second roller, disposed at a first end of the second hinged arm.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

Figures 1A, 1B, 1C:
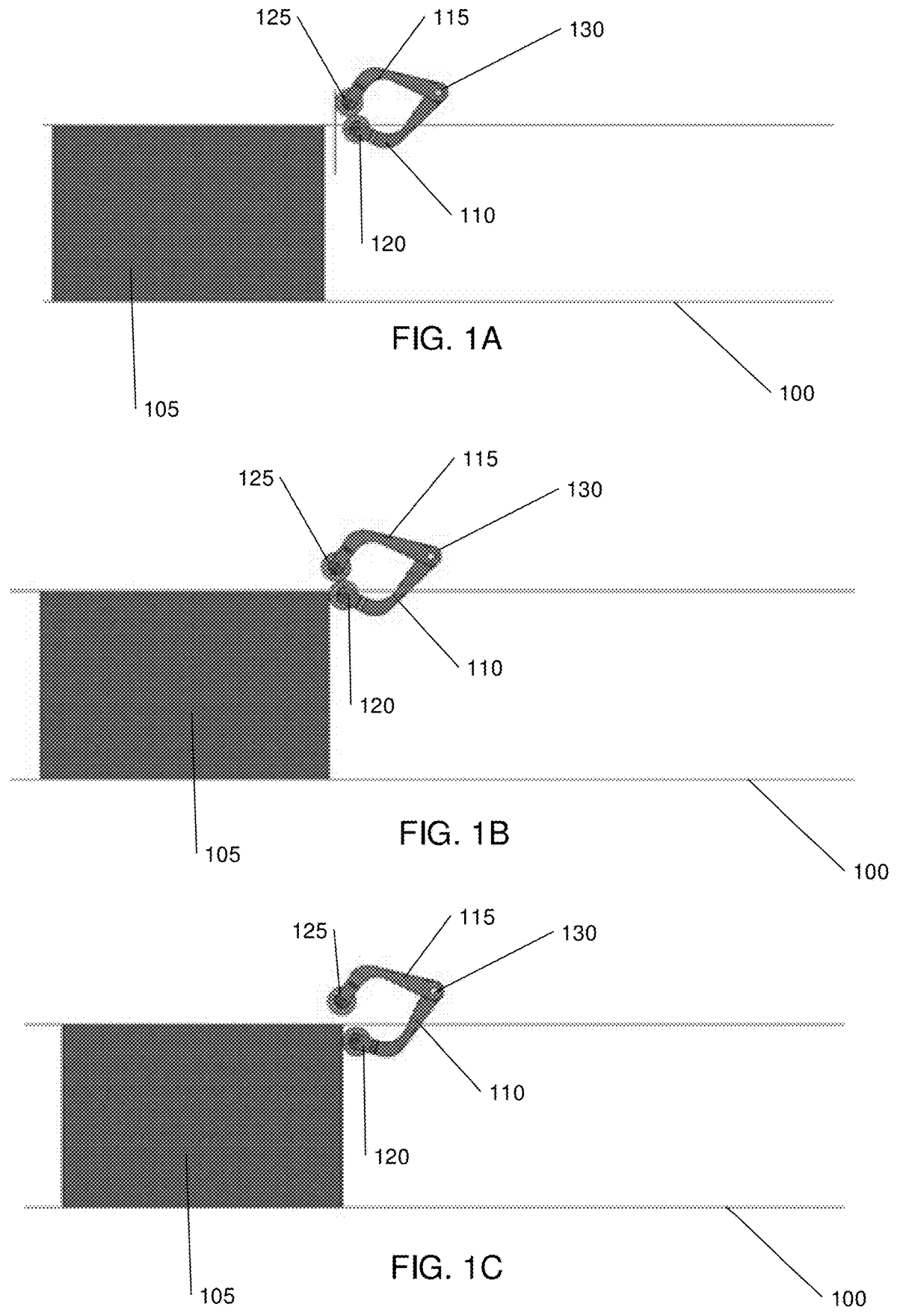

FIGS. 1A to 1J illustrate side views of a taping sequence for a top tapehead, according to an example embodiment of the present disclosure.

DETAILED DESCRIPTION

Figures 1D, 1E, 1F:
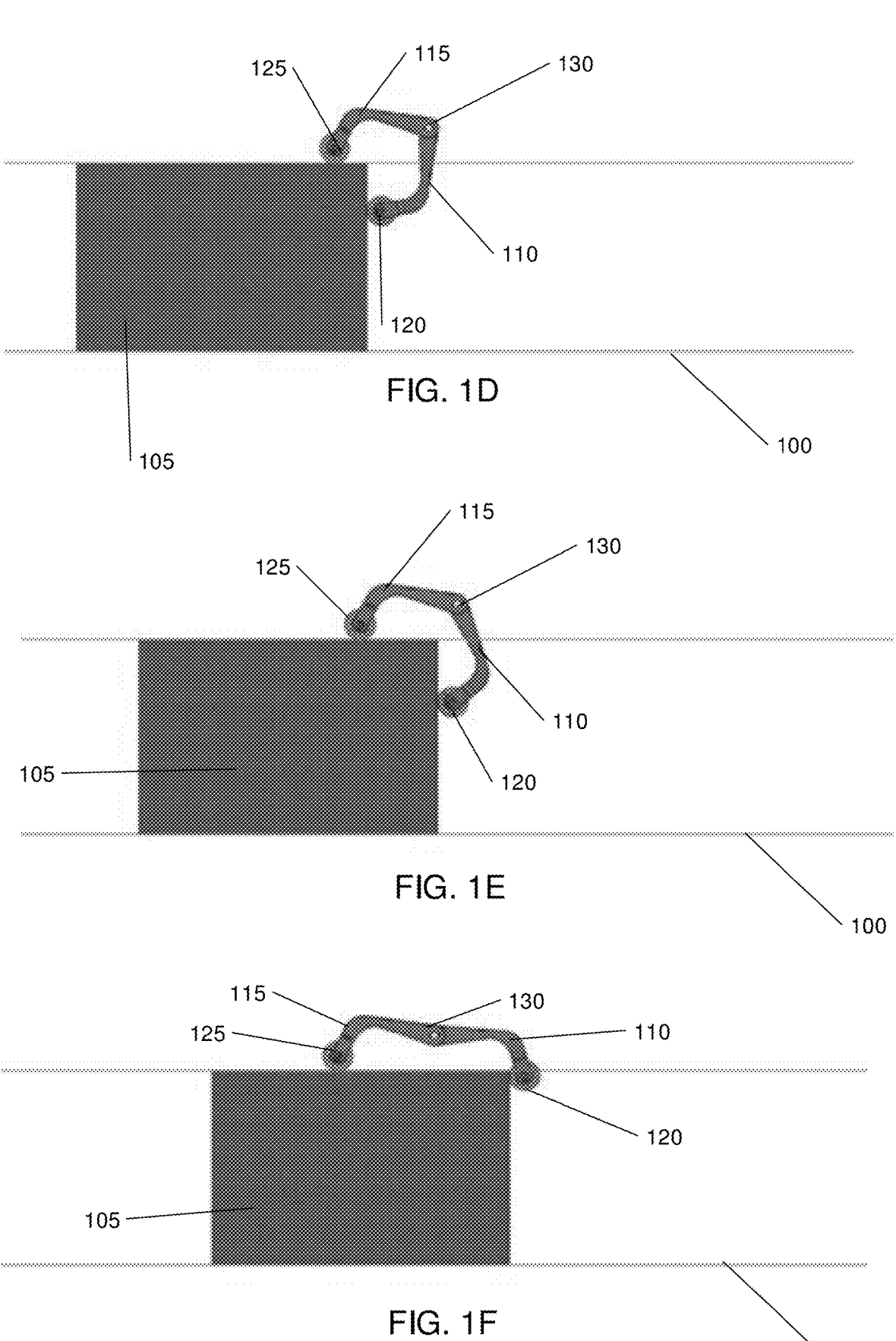

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the Figures, FIGS. 1A to 1J illustrate side views of a taping sequence for a top tapehead. Specifically, as disclosed herein, the wipedown mechanisms 130 are configured to provide variable speed wipedown of water activated tape and/or variable pressure wipedown of water activated tape. FIGS. 1A to 1J depict sequential wipedown of a carton 105, whereby water activated tape is disposed along a seam of the carton (e.g., the top seam of the carton). In an embodiment, the carton is moving from left to right from FIG. 1A to 1J via one or more conveyor belts 100. Additionally or alternatively, in an embodiment, the wipedown mechanism 130 is moving from right to left from FIG. 1A to 1J.

Wipedown mechanism 130 includes a first tape arm 110 with a first wipedown roller 120 at a first end of first tape arm. Wipedown mechanism 130 includes a second tape arm 115 with a second wipedown roller 125 at a first end of second tape arm 115. In an embodiment, first tape arm 110 and second tape arm 115 are coupled to one another in a hinged configuration. For example, a second end of first tape arm 110 is pivotably coupled to a second end of second tape arm 115. In an embodiment, wipedown mechanism 130 includes one or more springs or, alternatively, an automated motor or other mechanical device for biasing each of first tape arm 110 and second tape arm 115 towards one another (e.g., biased in a "closed" configuration). It should be appreciated that each of first tape arm 110 and second tape arm 115 can be biased with the same force onto the carton (e.g., via springs with the same spring constant) or be biased with different forces onto the carton (e.g., via springs with different spring constants).

FIGS. 1A to 1F illustrate that during the taping sequence for the top tapehead (e.g., the top seam of the carton 105), one or more conveyor belts 100 move the carton 105 into engagement with the wipedown mechanism 130, which pinches water activated tape between a front face of the carton 105 and the first wipedown roller 120. As the carton 105 continues to travel across the wipedown mechanism, the first wipedown roller 120 moves down the front face of the carton 105 (i.e., toward the conveyor belt 100). As a first tape leg is pressed onto the front face of the carton 105 via the first tape arm, and first wipedown roller 120 is rolled over the edge of the carton 105, the tape is pressed against the front face of the carton 105. Simultaneously, while the first wipedown roller 120 is wiping the water activated tape on the front face of the carton 105, the second wipedown roller 125 moves from its initial position across the top face of the carton 105. As the tape is pressed onto the top of the carton 105 via the second tape arm 115, the second wipedown roller 125 is rolled over the top of the carton 105, thus pressing tape against the top of the carton 105.

Figure 1G:
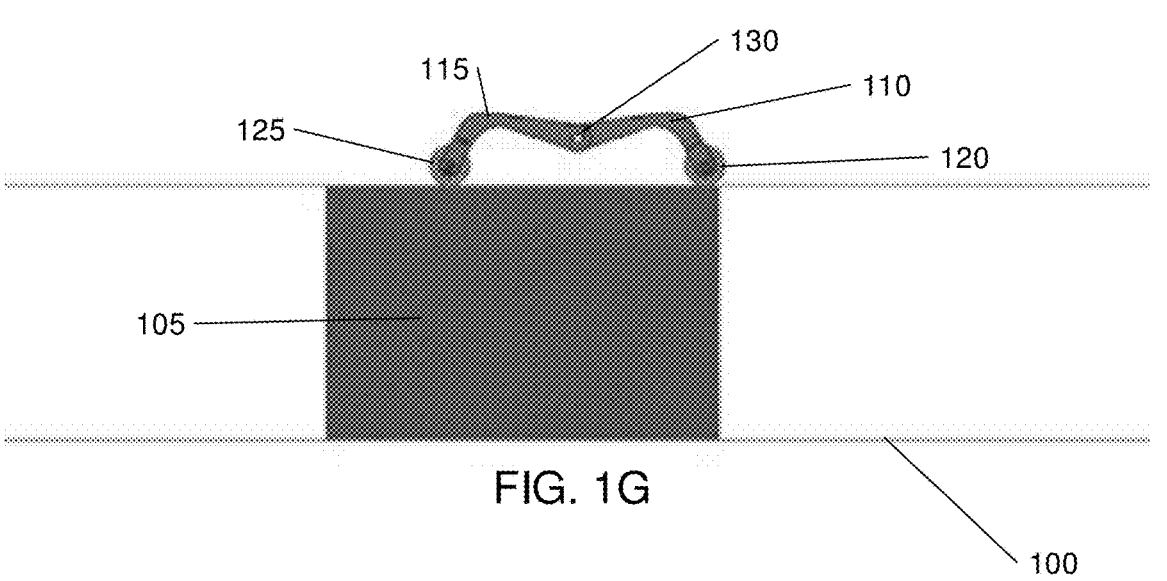
Figure 1H:
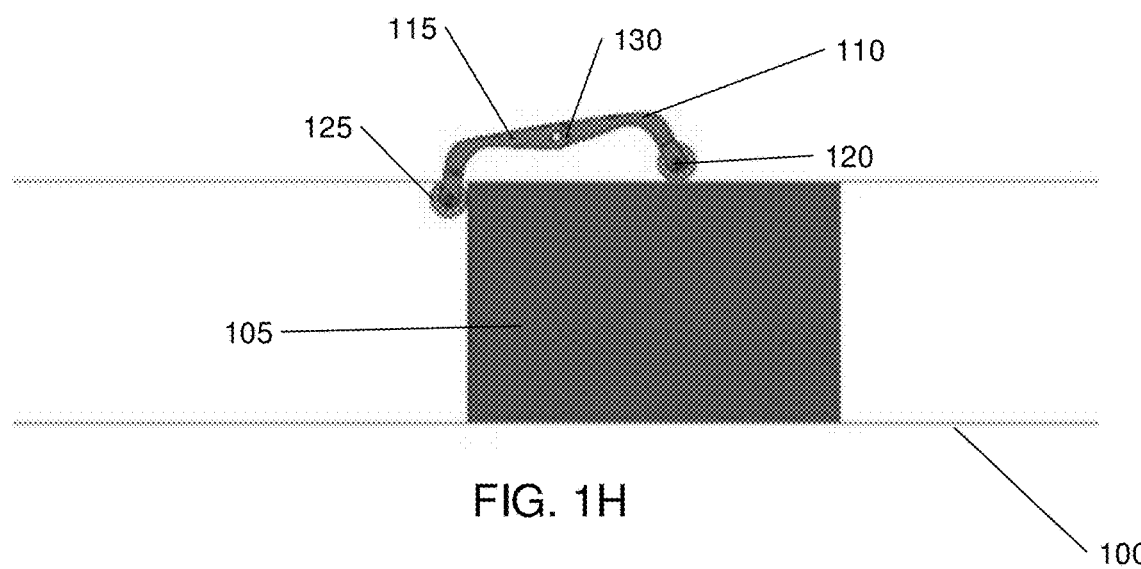

As illustrated by FIG. 1G, at some point both the first wipedown roller 120 and the second wipedown roller 125 are pressed onto the top of the carton 105, as the carton 105 continues to travel across wipedown mechanism.

Figure 1I:
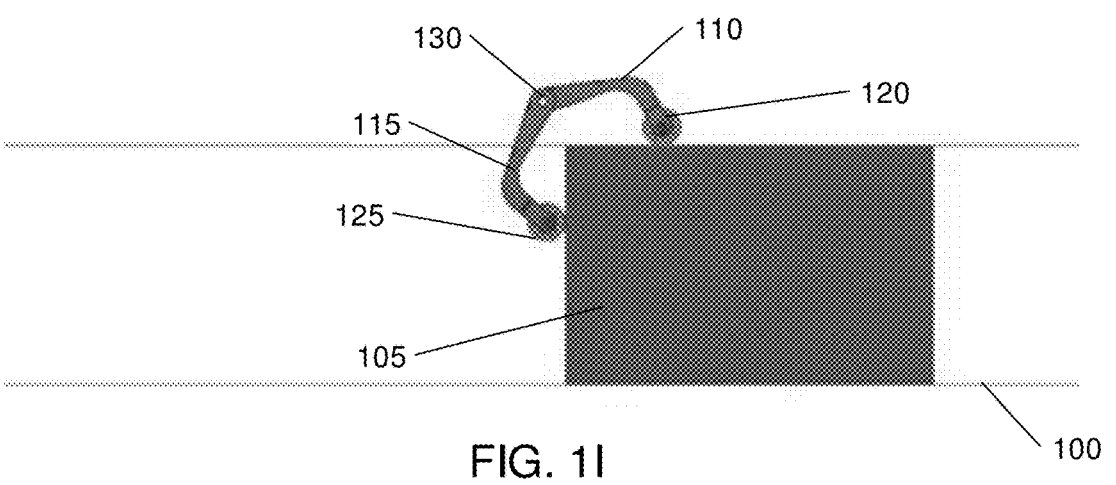
Figure 1J:
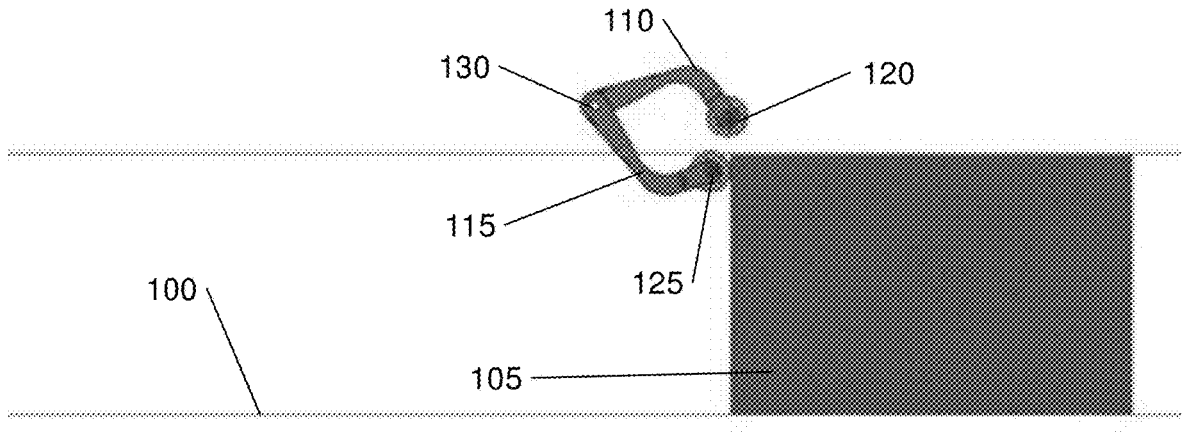

FIGS. 1I to 1J illustrate that, as the carton 105 continues to travel across the wipedown mechanism, the second wipedown roller 125 moves down the rear face of the carton 105 (i.e., toward the conveyor belt 100). As a second tape leg is pressed onto the rear face of the carton 105 via the second tape arm 115, and second wipedown roller 125 is rolled over the edge of the carton 105, the tape is pressed against the rear face of the carton 105. Simultaneously, while the second wipedown roller 125 is wiping the water activated tape on the rear face of the carton 105, the first wipedown roller 120 continues to move across the top face of the carton 105.

In an embodiment, an automated motor or other mechanical device biases each of first tape arm 110 and second tape arm 115 towards one another. In an embodiment, biasing is achieved by rotary pneumatic actuators. Namely, by being able to adjust the biasing force, wipedown mechanism 130 is able to provide variable wipedown pressure on a carton-by-basis, regardless of carton 105 size and/or conveyor speed during the wipedown process. This advantageously reduces the risk of crushing a front face of a carton 105 (e.g., crushing caused by first wipedown roller 120 with flimsier boxes or different sized boxes) while improving overall tape adhesion via continuous wipedown. This configuration further ensures that each of the first tape arm 110 and second tape arm 115 remain in-contact with various carton 105 surfaces, reducing the likelihood of carton 105 flaps being inadvertently lifted or folded.

In an embodiment, the rotary pneumatic actuators are controlled by programmable logic controllers and/or board-based processors. In an embodiment, one or more of the conveyor belt drive pulleys includes an encoder, which provides the programmable logic controller with positional information for the front face of the carton 105 and the rear face of the carton 105. Using this information, the programmable logic controller adjusts the variable wipedown pressure (via the rotary pneumatic actuators) when the front/rear faces of the carton 105 are at certain locations, relative to the wipedown rollers. In a different embodiment, the programmable logic controller calculates the relative positon of a carton 105 by considering one or more of conveyor belt speed, conveyor belt acceleration, carton speed, carton acceleration, relative positioning, and carton dimensions, and uses this relative position to adjust the variable wipedown pressure. For example, the encoder may provide the programmable logic controller with physical information associated with carton 105, such as its length based off a distance-traveled by the conveyor belt 100 measured via the encoder.

In addition to variable biasing force, the configurations disclosed herein provide for speed variation: reducing the conveyor speed during critical portions of the taping sequence, such as at corners, and increasing the conveyor speed during non-critical portions of the taping sequence, such as along the top. In an embodiment, conveyor belt speed is controlled via an external controller (e.g., a variable frequency drive programmed via a programmable logic controller). Other types of motors (e.g., brush and/or brushless DC) could likewise be used to drive conveyor belts 100. In various embodiments, the motors are controlled by programmable logic controllers and/or board-based processors.

In an embodiment, one or more of the conveyor belt drive pulleys includes an encoder, which provides the programmable logic controller with positional information for the front face of a carton 105 and/or the rear face of the carton 105. Using this information, the programmable logic controller adjusts the speed (via motor speed) when the front/rear faces of the carton 105 are at certain locations, relative to the wipedown rollers. In a different embodiment, the programmable logic controller calculates the relative positon of a carton 105 by considering one or more of conveyor belt speed, conveyor belt acceleration, carton speed, carton acceleration, relative positioning, and carton dimensions, and uses this relative position to adjust the speed.

Similarly, FIGS. 2A to 2J illustrate side views of a taping sequence for a bottom tapehead. FIGS. 2A to 2J depict sequential wipedown of a carton 105, having water activated tape along a seam of the carton 105 (e.g., the bottom seam of the carton 105). In an embodiment, the carton 105 is moving from left to right from FIG. 2A to 2J. Additionally or alternatively, in an embodiment, the wipedown mechanism 130 is moving from right to left from FIG. 2A to 2J.

Wipedown mechanism 130 includes a third tape arm 140 with a third wipedown roller 145 at a first end of third tape arm. Wipedown mechanism 130 includes a fourth tape arm 150 with a fourth wipedown roller 155 at a first end of fourth tape arm. In an embodiment, third tape arm 140 and fourth tape arm 150 are coupled to one another in a hinged configuration. For example, a second end of third tape arm 140 is pivotably coupled to a second end of fourth tape arm. In an embodiment, wipedown mechanism 130 includes a spring or, alternatively, an automated motor or other mechanical device for biasing each of third tape arm 140 and fourth tape arm 150 towards one another (e.g., biased in a "closed" configuration).

FIGS. 2A to 2F illustrate that during the taping sequence for the bottom tapehead (e.g., the bottom seam of the carton 105), one or more s move the carton 105 into engagement with the wipedown mechanism, which pinches water activated tape between a front face of the carton 105 and the third wipedown roller. As the carton 105 continues to travel across the wipedown mechanism, the third wipedown roller 145 moves up the front face of the carton 105. As a third tape leg is pressed onto the front face of the carton 105 via the third tape arm, and third wipedown roller 145 is rolled over the edge of the carton 105, the tape is pressed against the front face of the carton 105. Simultaneously, while the third wipedown roller 145 is wiping the water activated tape on the front face of the carton 105, the fourth wipedown roller 155 moves from its initial position across the bottom face of the carton 105. As the tape is pressed onto the bottom of the carton 105 via the fourth tape arm, the fourth wipedown roller 155 is rolled over the bottom of the carton 105, thus pressing tape against the bottom of the carton 105.

Figure 2A:
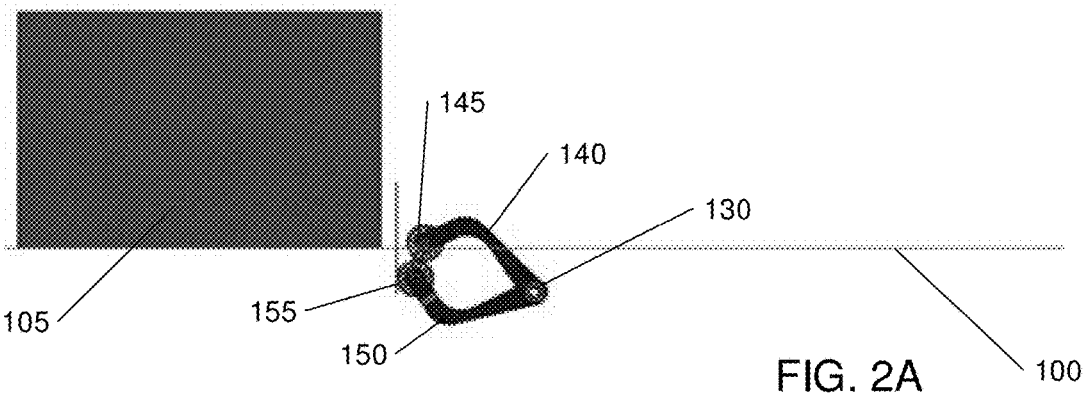
FIGS. 2A to 2J illustrate side views of a taping sequence for a bottom tapehead, according to an example embodiment of the present disclosure.
Figure 2B:
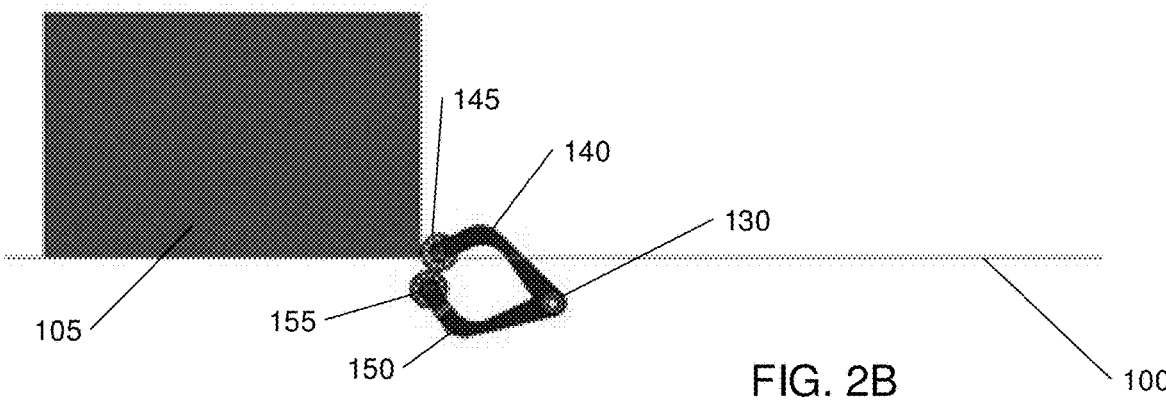
Figure 2C:
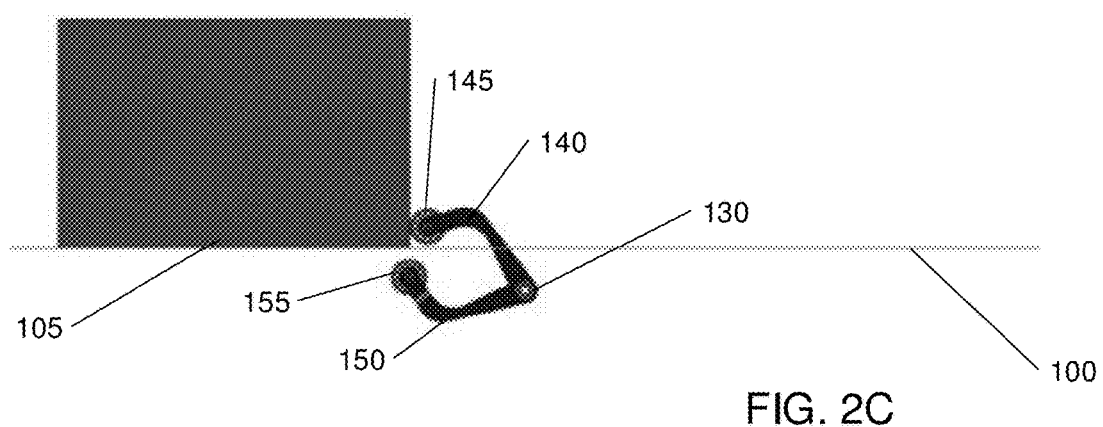
Figure 2D:
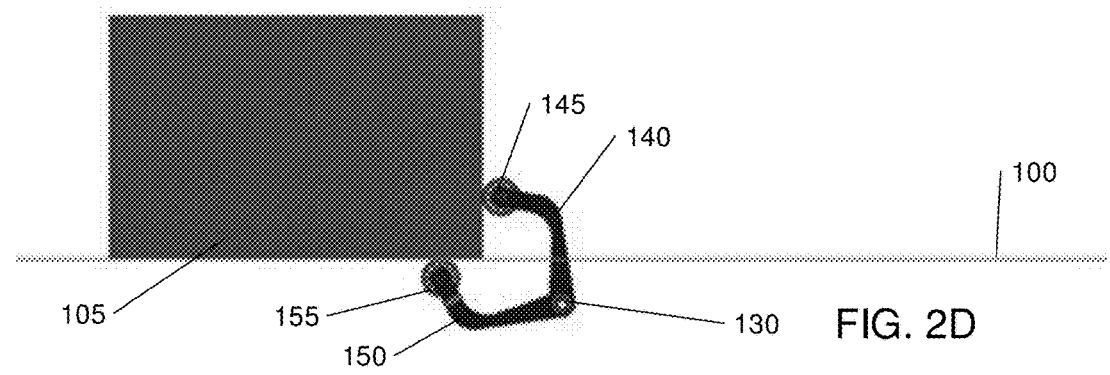
Figure 2E:
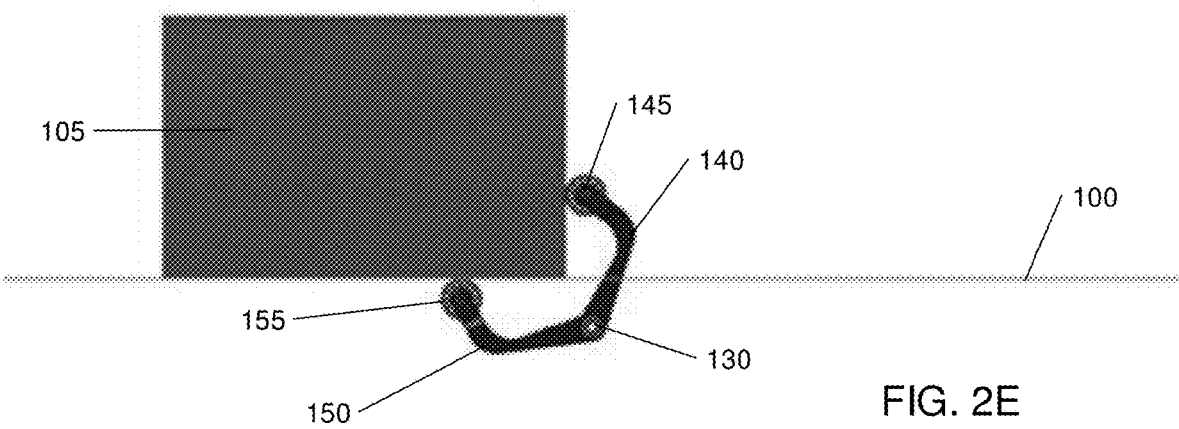
Figure 2F:
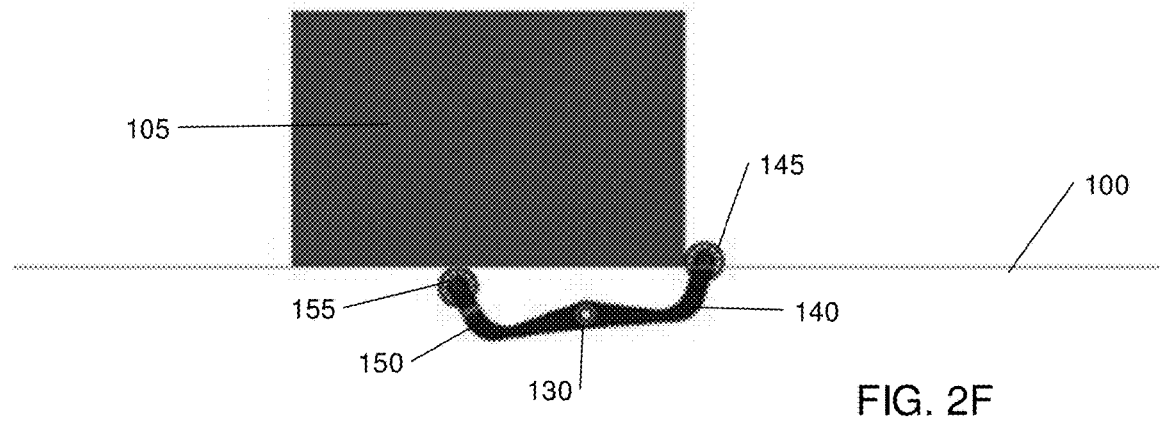
Figure 2G:
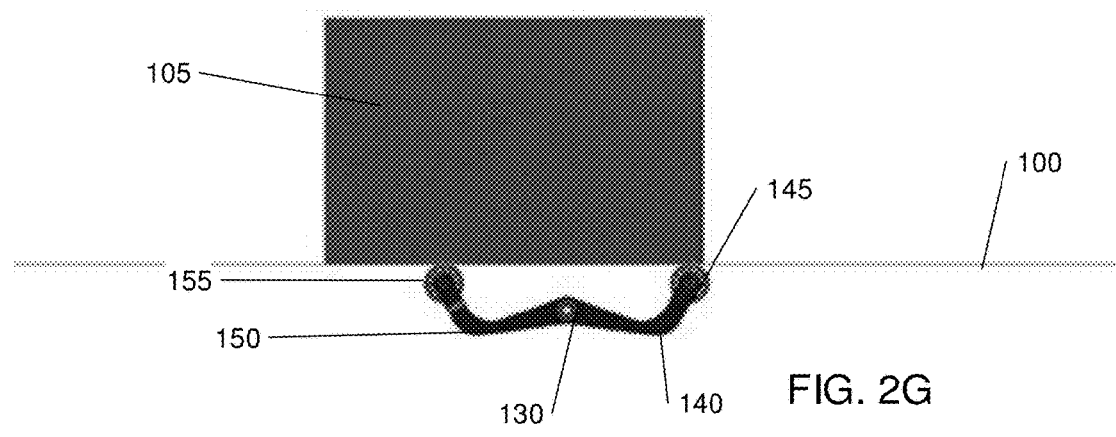
Figure 2H:
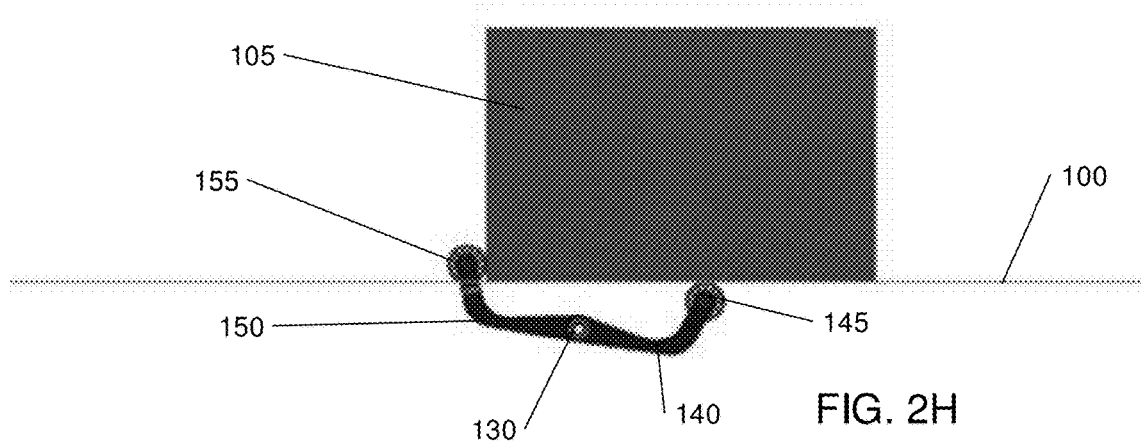

As illustrated by FIG. 2G, at some point both the third wipedown roller 145 and the fourth wipedown roller 155 are pressed onto the bottom of the carton 105, as the carton 105 continues to travel across wipedown mechanism.

Figure 2I:
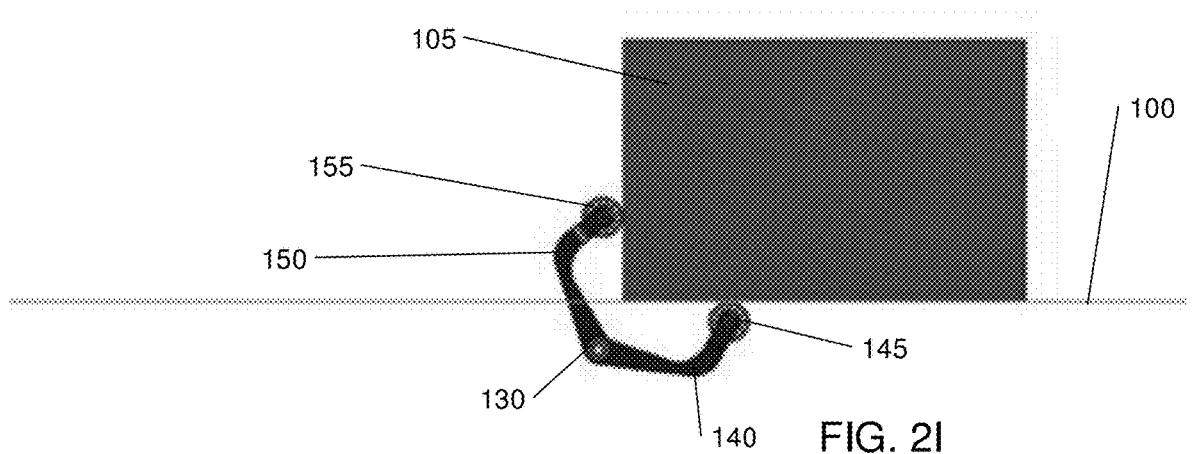
Figure 2J:
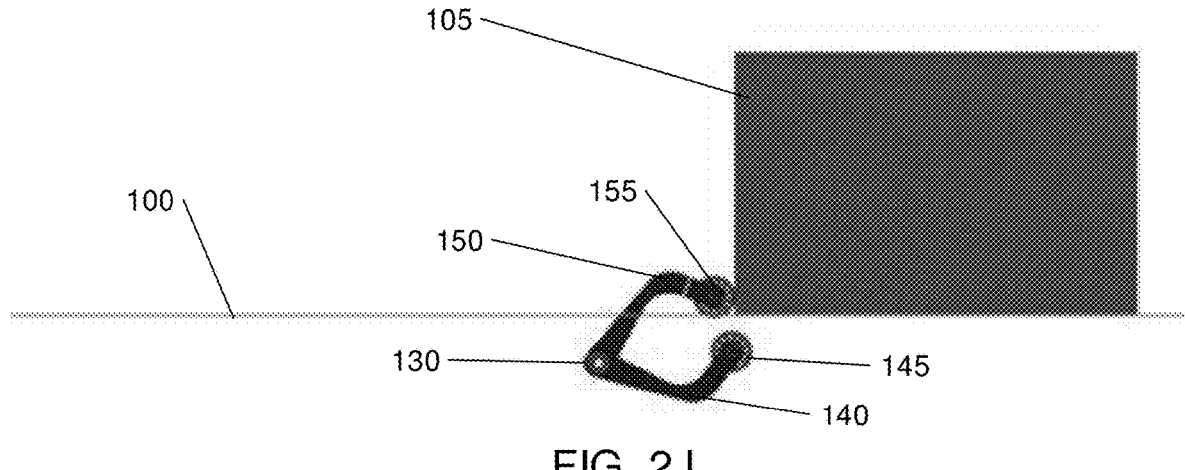

FIGS. 2I to 2J illustrate that, as the carton 105 continues to travel across the wipedown mechanism, the fourth wipedown roller 155 moves up the rear face of the carton 105. As the fourth tape leg is pressed onto the rear face of the carton 105 via the fourth tape leg, and fourth wipedown roller 155 is rolled over the edge of the carton 105, the tape is pressed against the rear face of the carton 105. Simultaneously, while the fourth wipedown roller 155 is wiping the water activated tape on the rear face of the carton 105, the third wipedown roller 145 continues to move across the bottom face of the carton 105.

It should be appreciated that benefits achieved by first tape arm 110 and second tape arm 115, as discussed above, are likewise achieved by third tape arm 140 and fourth tape arm 150 herein. Similarly, it should be appreciated that third tape arm 140 and fourth tape arm 150 may include additional structure as described above (e.g., rotary pneumatic actuators, and the like) to achieve similar functionality with respect to biasing and related control.

Figure 3:
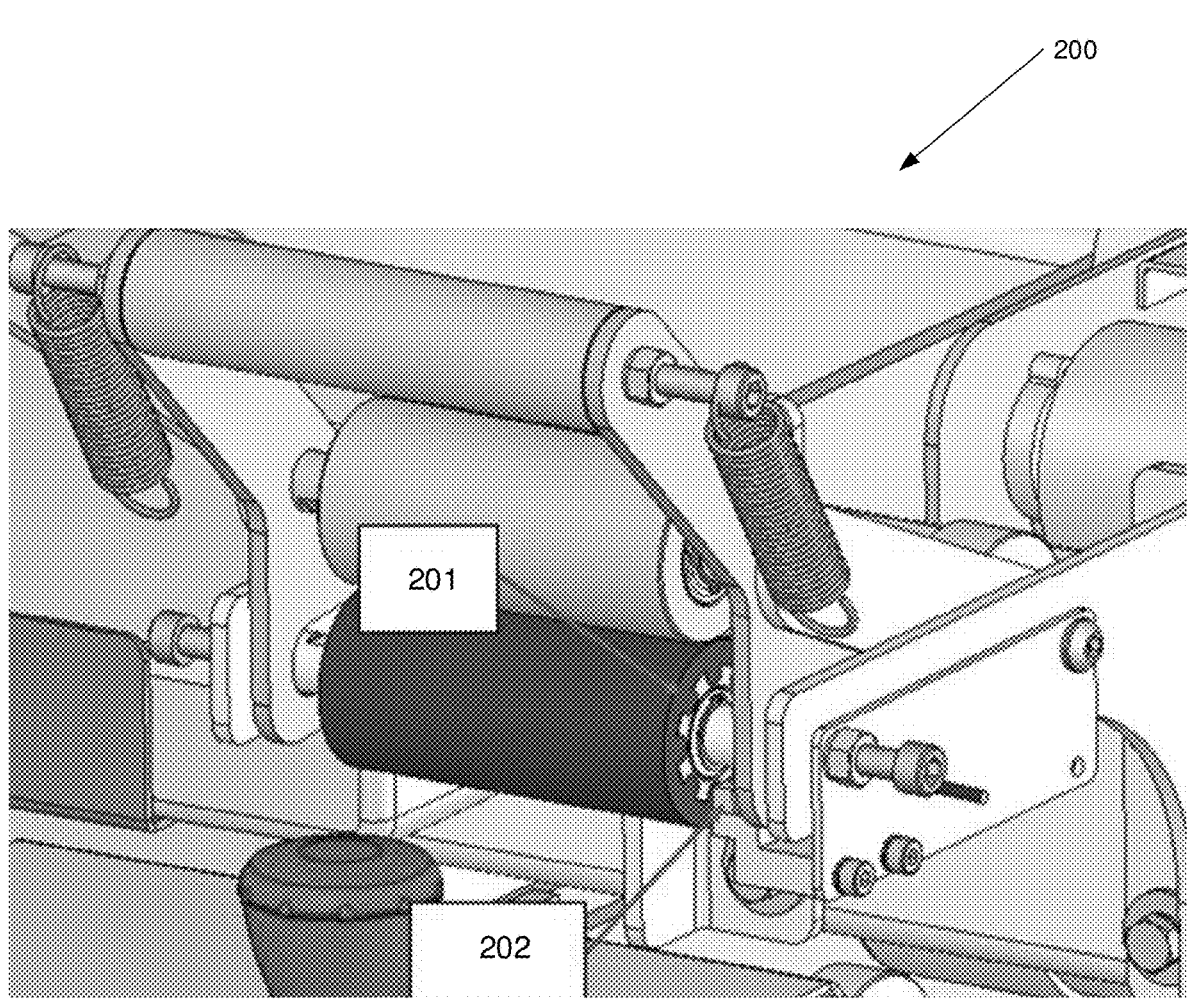
FIG. 3 illustrates a perspective view of components of a system for detecting tape errors, according to an example embodiment of the present disclosure.

FIG. 3 illustrates a perspective view of a system 200 for detecting tape errors. Namely, there are certain undesirable instances where the incorrect amount of tape is applied to a carton 105 as the carton 105 is processed through the wipedown mechanism 130 (i.e., too much tape or too little tape). This can happen for a variety of reasons including, but not limited, to tape arms slipping (e.g., off the front face of the carton 105), tape rollers jamming, and tape rollers running out of tape, prior to sealing a carton 105. These scenarios will result in an improperly taped carton 105. Moreover, due to sight limitations, the operator may not even be aware that a tape error has occurred. Thus, dynamically identifying tape errors (and correcting for tape errors) is critical.

To remedy these issues, the system 200 is configured to measure the amount of tape dispensed, and compare the amount of tape dispensed with a pre-calculated tape length. In instances where the amount dispensed exceeds or fails to meet a threshold or threshold range (as defined by the pre-calculated tape length), system 200 may alert the operator and/or enter a "lockup" or "shutdown" mode to ensure that any issues are remedied immediately.

Figure 4:
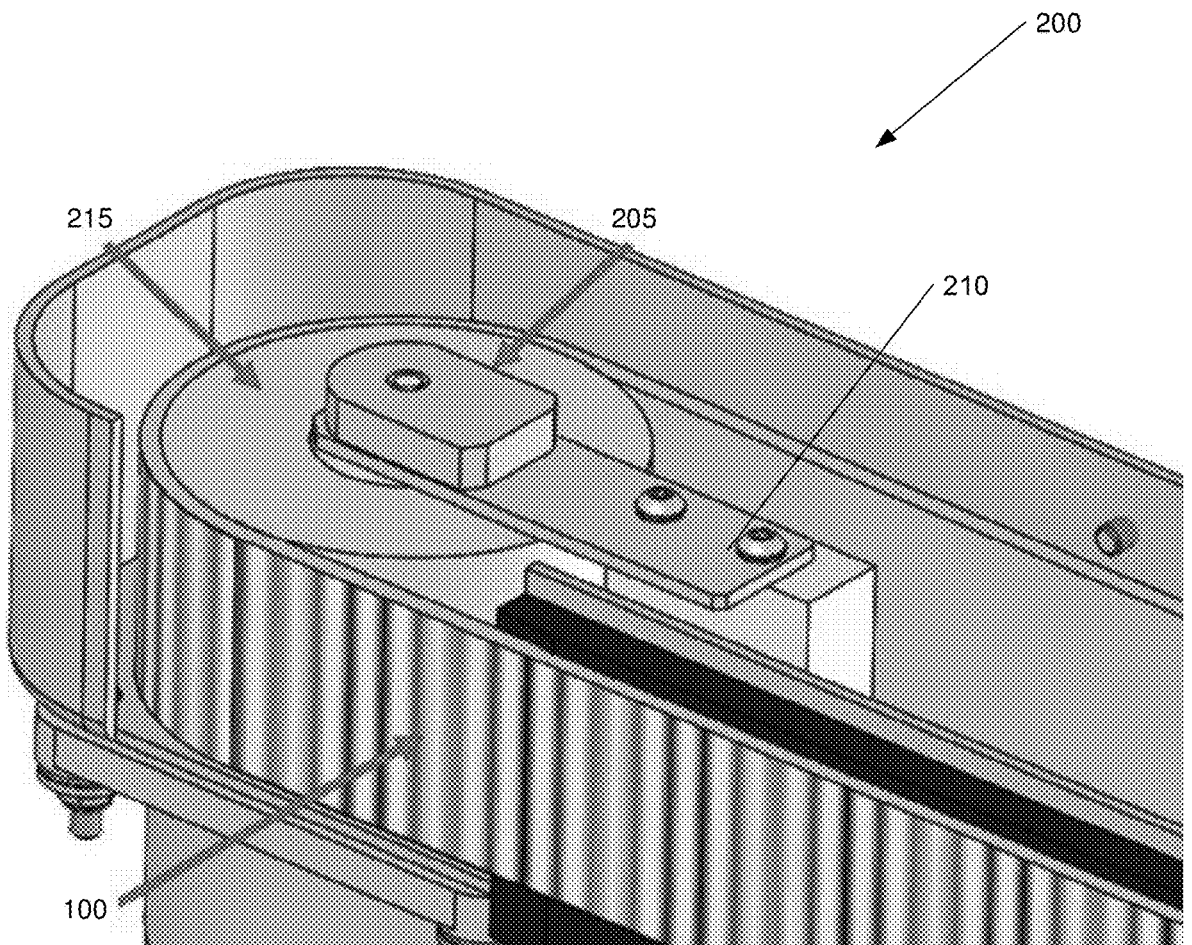
FIG. 4 illustrates a perspective view of components of the system for detecting tape errors, according to an example embodiment of the present disclosure.

In an embodiment, pre-calculated tape length is determined by summing the carton length, the first tape leg length, and the second tape leg length. As illustrated by FIG. 4, an encoder 205 is positioned on the belt drive 210, which drives the conveyor belt 100 and conveys carton 105. In an embodiment, the carton length is measured using the encoder 205 on the belt drive 210, in conjunction with a photoeye or similar optical-based encoder. Namely, the encoder 205 determines rotation of the belt pulley 215 and translates this rotational distance to a physical distance traveled by conveyor belt 100 (and thus a distance traveled by carton 105, which can be translated to length of carton 105). In a different embodiment, the carton length is measured by performing a calculation based on one or more of the photoeye, belt speeds, acceleration/deceleration constants on the motor controller, timers, and the like. In an embodiment, the first tape leg length is calculated based on a setting for the "Front Tape Leg" entered by the operator (or hardcoded in the programmable logic controller). Similarly, in an embodiment, the second tape leg length is calculated based on a setting for the "Rear Tape Leg" entered by the operator (or hardcoded in the programmable logic controller).

The amount of tape dispensed can be measured in a variety of ways. As illustrated by FIG. 3, in an embodiment, the tape is initially wrapped around a roller that rotates as the tape is dispensed or pulled off the roll during application. On the end of the roller there are series of physical cuts or markings 201 in the metal base of the roller, which pass by a proximity sensor 202 as the roller turns. This configuration functions as a makeshift encoder. The length of tape dispensed is determined by measuring the number of pulses detected by the proximity sensor 202, the number of cuts on the end of the roller, and overall the diameter of the roller. The accuracy of the tape length is based on the number of cuts in the end of the roller and the diameter of the roller. For example, with eight cuts and a diameter of 1.46" (37 mm) the accuracy is approximately +/−

Since there are tolerances associated with both the calculated tape length and the measured tape, a threshold value may be employed by the system, to determine if an error has occurred. Namely, if the pre-calculated length of tape minus the measured actual length of tape is greater or less than some threshold value (i.e., exceeding a pre-defined range), then there is an error. System 200 may alert the operator and/or enter a "lockup" or "shutdown" mode to ensure that any issues are remedied immediately. The threshold value can be set by the operator or, alternatively, hardcoded in the programmable logic controller.

The system herein may also be used to alert the operator that the tape roll has been depleted or is near depletion. If the first tape leg is dispensed and the tape length measuring device does not measure any pulses, or it measures too few pulses, then there is no more tape wrapped around the roller and therefore the roller is "empty."

Figure 5:
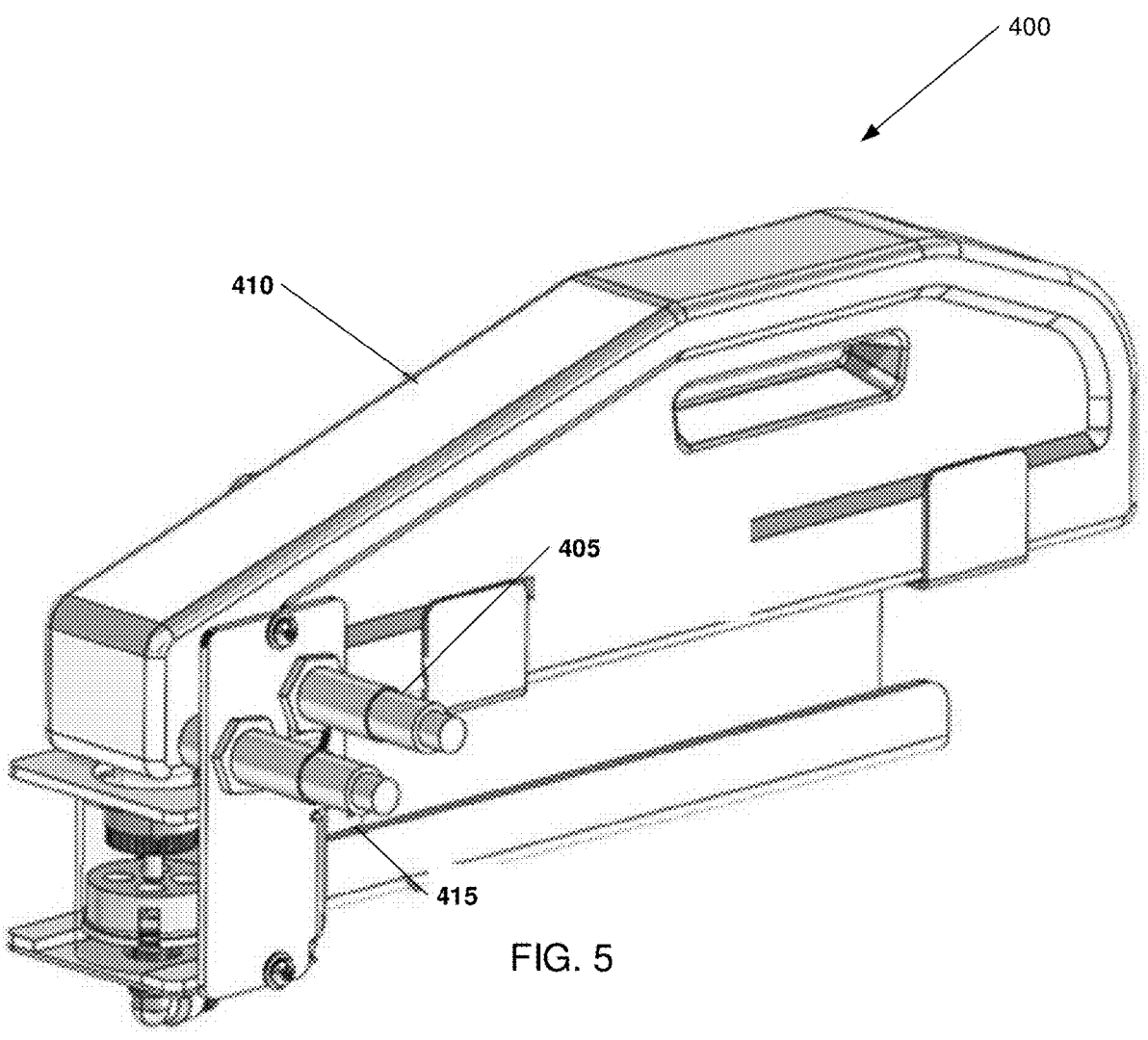
FIG. 5 illustrates a perspective view of a water level sensor and detection system, according to an example embodiment of the present disclosure.

In another embodiment, FIG. 5 illustrates a perspective view of a water level sensor and detection system 400. Water activated tape systems typically include one or more water bottles 410 for storing water, which is subsequently used as a wetting mechanism on a tapehead during application of the water activated tape. If the system runs out of water, any applied tape will fail to properly adhere to cartons. If the operator is not paying sufficient attention, or cannot see the water level in the bottle(s) 410, the system is a risk for tape failure.

To prevent tape failure, the systems herein implement one or more water level sensors 405 to detect the water level within each of the water bottles 410. In an embodiment, the water level sensors include one or more of float switches, photovoltaic level sensors, mechanical switches based on bottle weight, and the like. In a preferred embodiment, the water level sensor is a capacitive proximity sensor 202, which is configured to detect the presence of water in the bottle 410. For example, one capacitive proximity sensor 202 may be a low water sensor 405 configured to alert the operator that the water in the bottle 410 is almost depleted (i.e., a low water condition). Another capacitive proximity sensor 202 may be a no water sensor 415 configured to stop the system and alert the operator that the water in the bottle 410 is fully depleted (i.e., a no water condition).

It should be appreciated that the systems herein may further provide for pass-through. For example, certain distribution/fulfillment centers may ship items "as-is," in their original containers instead of placing the items in another carton. To the extent these as-is items are processed on the same lines as cartons being processed through the water activated system disclosed herein, there needs to be some means of preventing the as-is items from being taped. While as-is items can be manually removed by an operator, or diverted around the system via additional conveyors, these solutions consume additional valuable resources and increase inefficiencies. Pass-through is thus an ideal solution.

In various embodiments, pass-through is initiated via one or more of a barcode scanner, box measurement (e.g., length, width, and/or height), automated sequencing, or operator input. In a preferred embodiment, a foot pedal communicates with the water activated system; via this fool pedal, the operator can visually identify an item and subsequently initiate a pass-through for the system.

Once the operator has initiated a pass-through, the tape arms are withdrawn from the area of application, such that no tape is applied to the as-is item as it passes through the water activated system. In an embodiment, only the tape roller is withdrawn from the surface of as-is box; the remaining wipedown rollers still contact the as-is box. In a different embodiment, both the tape roller and the wipedown rollers are withdrawn from the surface of as-is box. In another different embodiment, the wipedown rollers are withdrawn and the front tape leg is not dispensed onto a front of the as-is box. In an embodiment, pass-through mode further results in an increased conveyor speed; for example, processing time can be improved when the as-is item does not require taping and can be quickly passed through the water activated system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A water activated tape system, comprising:
   a tape roller, configured to dispense water activated tape;
   a water bottle, configured to provide liquid to wet the water activated tape;
   a conveyor belt, configured to convey a carton;
   a first wipedown mechanism, configured to press the water activated tape onto the carton, wherein the first wipedown mechanism includes:
      a first hinged arm,
      a first roller, disposed at a first end of the first hinged arm,
      a second hinged arm, and
      a second roller, disposed at a first end of the second hinged arm;
   an encoder coupled to the conveyor belt; and
   a processor, configured to adjust a variable wipedown pressure for the first wipedown mechanism based on the encoder.

2. The water activated tape system of claim 1, wherein the processor is further configured to calculate a length of water activated tape applied to the carton.

3. The water activated tape system of claim 2, wherein the length of water of activated tape is calculated by measuring rotation of the tape roller.

4. The water activated tape system of claim 3, wherein rotation of the tape roller is determined via a second encoder disposed on the tape roller.

5. The water activated tape system of claim 4, wherein the second encoder is an optical encoder.

6. The water activated tape system of claim 2, wherein length of water activated tape is calculated by measuring a length of the carton via a distance traveled by the carton.

7. The water activated tape system of claim 6, wherein the distance traveled by the carton is determined via the encoder.

8. The water activated tape system of claim 1, wherein a second end of the first hinged arm is pivotably coupled to a second end of the second hinged arm.

9. The water activated tape system of claim 1, wherein the first wipedown mechanism is configured to engage with a first corner of the carton, such that the first roller engages with a front face of the carton, and such that the second roller engages with a top face of the carton.

10. The water activated tape system of claim 1, further comprising a second wipedown mechanism, wherein the second wipedown mechanism is configured to engage with a second corner of the carton, such that a third roller engages with a front face of the carton, and such that a fourth roller engages with a bottom face of the carton.

11. The water activated tape system of claim 1, wherein the water bottle includes a sensor to determine a level of water in the water bottle.

12. The water activated tape system of claim 1, further comprising:
  a biasing device coupled to the first wipedown mechanism; and
  wherein the processer is further configured to adjust a biasing force of the biasing device to adjust the variable wipedown pressure.

13. A water activated tape system, comprising:
  a tape roller, configured to dispense water activated tape;
  a water bottle, configured to provide liquid to wet the water activated tape;
  a first wipedown mechanism, configured to press the water activated tape onto a carton;
  a conveyor belt, configured to convey the carton,
  a first encoder coupled to the conveyor belt; and a processor, configured to:
    determine physical information associated with the carton, wherein the physical information is a length of the carton, a distance traveled by the carton, or positional information for the carton; and
    determine a variable wipedown pressure for the first wipedown mechanism based on the first encoder.

14. The water activated tape system of claim 13, wherein the physical information of the carton is used to calculate a length of water activated tape applied to the carton.

15. The water activated tape system of claim 14, wherein the processor compares the length of water activated tape applied to the carton to a threshold length.

16. The water activated tape system of claim 15, wherein responsive to the length of water activated tape applied to the carton exceeding the threshold length, sounding an alarm.

17. The water activated tape system of claim 13, wherein a length of water activated tape is calculated by measuring rotation of the tape roller via a second encoder coupled to the tape roller that applies the water activated tape to the carton.

18. The water activated tape system of claim 13, wherein the first wipedown mechanism includes:
  a first hinged arm,
  a first roller, disposed at a first end of the first hinged arm,
  a second hinged arm, and
  a second roller, disposed at a first end of the second hinged arm.

19. A water activated tape system, comprising:
  a tapehead having a tape roller configured to dispense water activated tape and apply the water activated tape to a carton;
  a water bottle, configured to provide liquid to the tapehead to wet the water activated tape;
  a first wipedown mechanism, configured to press the water activated tape onto the carton;
  a first encoder coupled to the tape roller; and
  a processor, configured to determine a length of tape dispensed based on the first encoder.

\* \* \* \* \*